United States Patent [19]
Schwald et al.

[11] Patent Number: 5,363,341
[45] Date of Patent: Nov. 8, 1994

[54] LEVEL MEASURING DEVICE WHICH CAN BE ASSEMBLED FROM COMPONENTS

[75] Inventors: Rolf Schwald, Schopfheim; Edwin Steinebrunner, Todtnau, both of Germany

[73] Assignee: Endress u. Hauser GmbH u. Co., Germany

[21] Appl. No.: 689,830
[22] PCT Filed: Oct. 5, 1990
[86] PCT No.: PCT/DE90/00761
§ 371 Date: May 28, 1991
§ 102(e) Date: May 28, 1991
[87] PCT Pub. No.: WO91/05226
PCT Pub. Date: Apr. 18, 1991

[30] Foreign Application Priority Data
Oct. 6, 1989 [DE] Germany ............... 3933474

[51] Int. Cl.$^5$ ............................................. H04R 17/00
[52] U.S. Cl. ........................................ 367/140; 367/173; 367/908; 73/290 V; 181/123; 181/124; 310/348
[58] Field of Search ............... 367/140, 157, 173, 908; 310/348, 334; 181/123, 124; 73/290 V

[56] References Cited
U.S. PATENT DOCUMENTS
3,910,116 10/1975 Smith ................... 73/290 V
4,912,686 3/1990 Craster ................. 73/290 V FOREIGN PATENT DOCUMENTS
8332045 4/1984 Germany .
3633047 4/1988 Germany .
2195445 4/1988 United Kingdom .
WO84/00607 2/1984 WIPO .

Primary Examiner—J. Woodrow Eldred
Attorney, Agent, or Firm—Barnes & Thornburg

[57] ABSTRACT

The invention discloses a level measuring device which can be made up from components. It comprises a sonic or ultrasonic transducer which is arranged in a first housing and forms a self-contained functional unit; the electrical circuit arranged in a further separate housing forms a second functional unit. The functional units are so constructed that they can be assembled from the various components to a complete level measuring device in accordance with the required use conditions by arrangement of a steel plate above the sonic or ultrasonic transducer, or by potting with a commercially usual potting composition, or the selection of two different similar housings for receiving the sonic or ultrasonic transducer or the arrangement of selectively different but dimensionally identical sonic or ultrasonic transducers, and the selective mounting by means of a loose flange on a container, or by means of a suspension bracket in the interior thereof or above a drain.

16 Claims, 3 Drawing Sheets

LEVEL MEASURING DEVICE WHICH CAN BE ASSEMBLED FROM COMPONENTS

The invention relates to a sonic or ultrasonic transducer for measuring the contents level in a container or above a drain. A distinction must be made in the measurement of the contents level using such a sonic or ultrasonic transducer as regards the medium to be measured. If the level of a medium is measured which causes normal environmental conditions the level sensor can be of simple construction and made in economic manner. If, however, a measurement of an explosive or aggressive medium is to be made stricter demands are made on the sonic or ultrasonic sensor due to the fact that when used in explosive media maximum safety is required for avoiding any danger of explosion and when used in aggressive media resistance to the destructive force of said media is necessary.

It is known from German utility model 8,332,045, for measuring the level in an explosion-endangered inner zone of a container to enclose the ultrasonic sensor of a contents level measuring device in an additional metal housing to ensure that the plastic housing, which is not impact-proof and flameproof, does not undergo any electrostatic charging and does not come into contact with the potentially explosive medium.

From German utility model 8,630,763 another sonic or ultrasonic sensor is known which was proposed for use in aggressive media. The solution described therein resides in that an integral transducer housing is provided which surrounds the transducer element on the container side and has a ring extension which radially overlaps a partial area of the annular sealing strip of the sensor flange with which the sensor is connected to a wall. The transducer housing is made from a plastic resistant to aggressive media, in particular from a polyvinylidene fluoride.

German patent 3,633,047 discloses another level measuring device for measuring the contents level in a container having an explosion-endangered inner zone which is so designed that the sonic or ultrasonic transducer is arranged substantially in the interior of a metal flange which forms at the same time the securing element for attaching the sonic or ultrasonic transducer to the wall surrounding the medium to be measured. In this device the surface of the flange facing the interior of the container forms a homogeneous continuous smooth surface which incorporates the diaphragm of the sonic or ultrasonic sensor and thereby prevents any materials other than the metallic flange material from being able to come into contact with the explosive media. Depending on the selected metallic flange material this device is also suited to be used in aggressive media.

All these devices have the disadvantage that a complete level measuring device must be made to suit the particular intended use.

In contrast, the present invention is based on the problem of configuring a level measuring device of the aforementioned type so that it consists of individual components which can be selectively assembled depending on the intended use in explosive or aggressive or normal ambient conditions.

This problem is solved by the features described in the claims.

The device according to the invention has the further advantage that the individual self-contained functional parts are surrounded as hitherto known by economically produceable plastic housings but nevertheless fulfill the conditions involved in use in explosive and/or aggressive media.

An advantageous embodiment of the invention is characterized in the subsidiary claims.

Further features and advantages are set forth in an example of embodiment of the invention and in the drawings. In the drawings.

Figure 1:
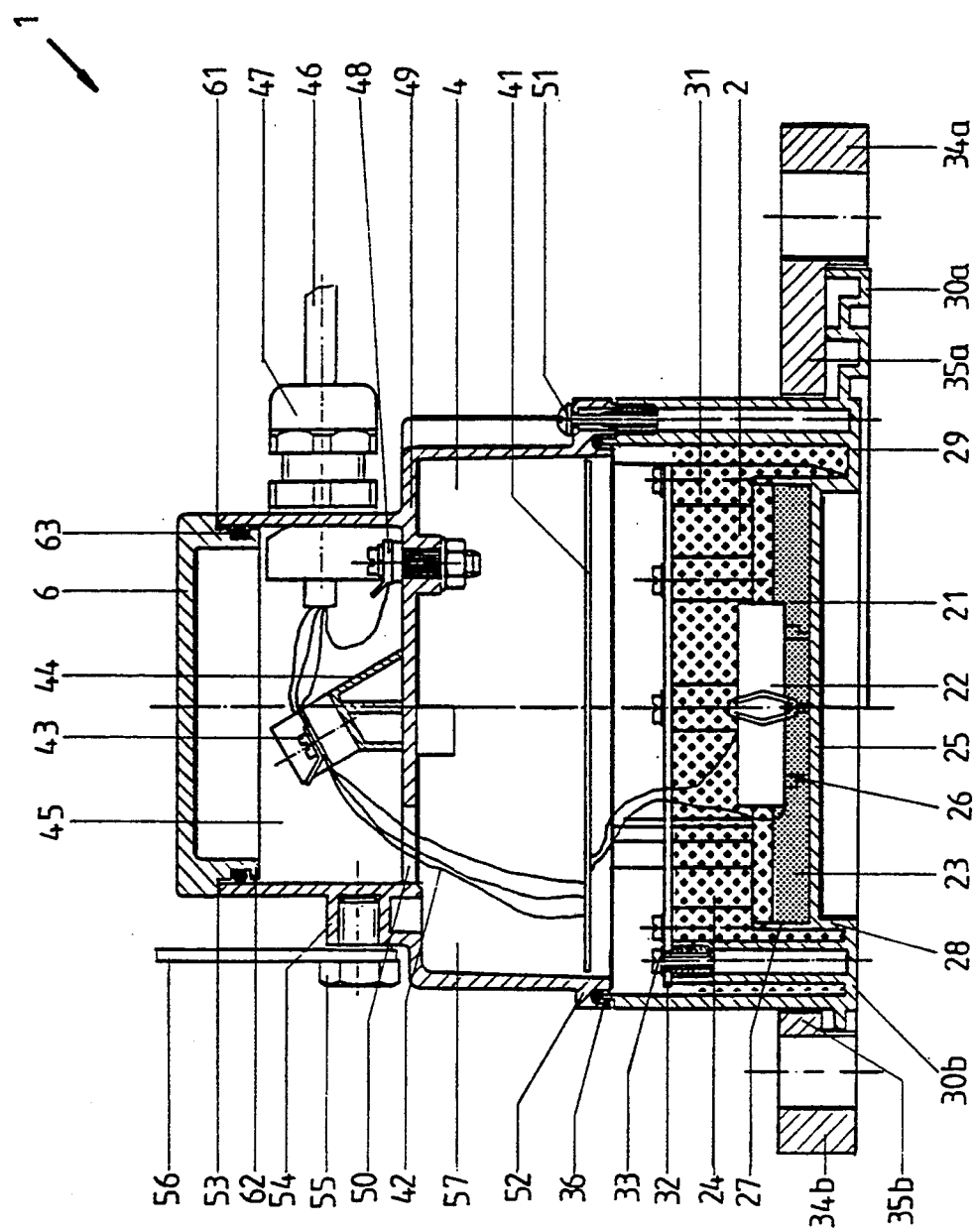
FIG. 1 is a section through the subject of the invention in side view.

In FIG. 1 a level measuring device 1 is shown which consists of individual components and can be assembled in accordance with the intended use. It consists of the transmitter and receiver housing 2, the hood 4 and the cover 6.

In the interior of the housing 2 the transmitting and receiving transducer 21 is accommodated. It generates a transmitted pulse directed onto the surface of the filling material to be measured and receives the echo reflected by the surface of said material. The transmitting and receiving transducer 21 consists in known manner of the piezoceramic element 22, the matching layer 23, the attenuation layer 24 and the diaphragm 25. The layers 23, 24 consist of a silicone elastomer. The piezoceramic element 22 is connected to the diaphragm 25 via spacers 26. To protect the membrane 25 the latter is set back somewhat in known manner with respect to the end of the housing 2 facing the filling material.

To decouple the transmitting and receiving transducer 21 from the housing 2 as regards structure-borne sound said transducer 21 is not connected directly to the wall of the housing 2 but is arranged within a cylindrical trough 27 which extends in the axial direction from the diaphragm 25 and occupies a position coaxial with the axis of symmetry of the housing 2. The trough 27 and the housing 2 are connected to each other only via the short cylindrical portion 28 and the annular zone 29 of a sealing strip 30a, 30b.

Figure 2:
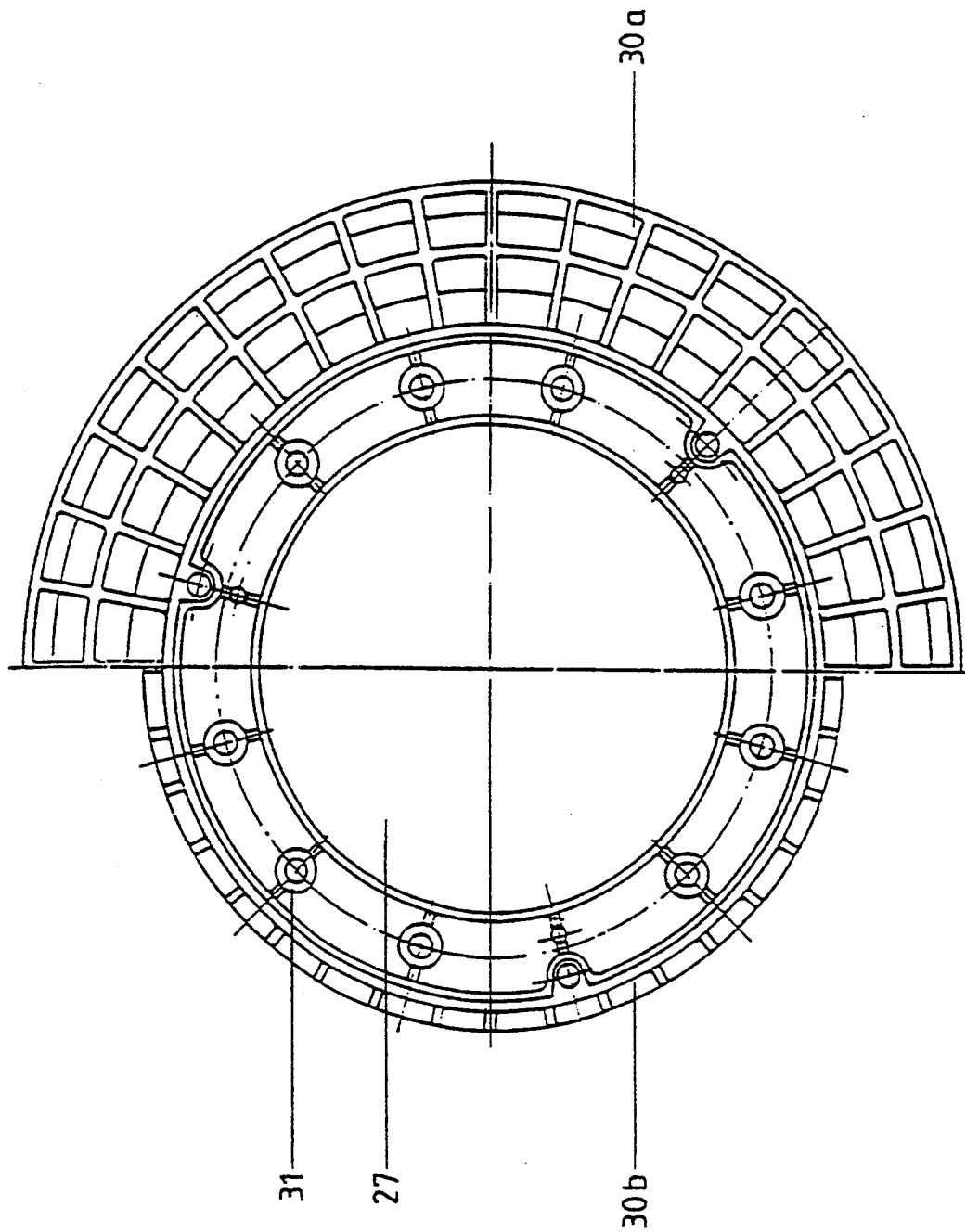
FIG. 2 is a plan view of the transducer housing of the subject of the invention according to FIG. 1.

Further cylindrical supports 31 are arranged in the interior of the housing 2. The cylindrical supports 31 are integrally formed on the ring zone 29 and extend at equal intervals from each other arranged on a hole circle along the inner surface of the housing 2. They assume a position such that they are not in any spatial connection with the surface of the housing 2 (FIG. 2). At their end remote from the ring zone 29 the cylindrical supports 31 are provided with an internal thread.

The interior of the housing 2 is almost completely filled by the attenuation layer 24. The height of the attenuating layer 24 assumes a position coinciding substantially with the ends of the supports 31. For using the level measuring device in containers in which atmospheric pressure obtains the transmitting and receiving transducer is terminated here. If however, the level measuring device 1 is to be used in a container of which the inner pressure lies above that of the normal atmosphere the diaphragm is also subjected to said pressure. To prevent bow of the diaphragm the transmitting and receiving transducer 21 is closed by a steel plate 32. The steel plate 32 rests on the attenuation layer 24 and is secured by means of screw connections 33 to the cylindrical supports 31. The steel plate 32 then takes up the inner pressure of the container over the diaphragm and also prevents vibration energy of the piezoceramic element 22 from being irradiated through the attenuation layer 24 to the side remote from the diaphragm 25.

The spatial extent of the trough 27 is such that in the latter, depending on the intended use, various types of piezoceramic elements surrounded by a matching and attenuation layer can be accommodated.

This itself gives several constructional possibilities, dependent on the intended use, for the transmitting and receiving transducer 2:

without steel plate 32 for use at atmospheric pressure;

with steel plate 32 for use under elevated pressure conditions;

the two constructions with different piezoceramic drives.

In known manner the housing 2 is made as injection molding from a thermoplastic and chemically resistant plastic, for example from polyvinylidene fluoride. To enable such a plastic part to be used in an explosive atmosphere, precautions must be taken to avoid the static charging thereof. The sealing strip 30a, 30b is arranged on the housing 2 at the side facing the medium to be measured. The purpose of the sealing strip 30a, 30b is to seal the aperture of a wall surrounding the medium to be measured through which the level measuring device 1 comes into contact with the medium to be measured, with interposition of an annular flat seal, and also to secure the level measuring device 1 to the wall. The sealing strip 30 extends radially from the surface of the housing 2. As apparent from FIG. 1, the sealing strip 30a, 30b is so configured that it can be enclosed by the shoulder 35a, 35b of a coupling flange 34a, 34b. It is so configured that it can be enclosed by any desired flanges, i.e. flanges made in accordance with domestic and foreign flange standards.

The configuration of the sealing strip 30a extending to the right from the surface of the housing 2 is different from 30b extending from the left side of the housing 2. This is intended to illustrate that the housing 2 can be made in two different variants, once again in accordance with the intended use. The housing forms are made in a manner known per se by an insert part introduced into the injection mold; whereas the sealing strip 30a is intended for large nominal widths and is formed by two separate annular sealing surfaces which extend outside the surface of the housing 2 and are simultaneously surrounded by the shoulder 35a of the flange 34a, the sealing strip 30b is arranged within the surface of the housing 2 and formed by a closed annular sealing surface. The shoulder of the housing 2 opposite the shoulder 35b of the flange 34b and engaged thereby extends radially adjoining the sealing surface 30b from the surface of the housing 2.

For smaller nominal widths a configuration of the housing with the sealing strip 30b suffices.

To prevent the static charging caused by friction, the portions 30a, 30b extending from the surface of the housing 2 are interrupted by intermediate walls and recesses so that only small continuous areas preventing a charging are present. FIG. 2 shows how these integrally formed portions are configured by insertion of ribs and cutouts.

Further specific constructional types of the level measuring device 1, again depending on the intended use, are possible for the housing 2 configured in the foregoing manner:

split sealing strip also lying outside the housing for larger nominal widths;

integrated sealing strip with integrally formed shoulder for smaller nominal widths;

both constructions with different flanges, depending on the mounting conditions at the measuring site.

Of course, each of these embodiments can be combined with the embodiments already referred to and this itself results in a great number of possible configurations.

The level measuring device i is also formed by the hood 4. The hood 4 is likewise made as injection molding from a thermoplastic plastic, advantageously from a polybutylene derephthalate. In its interior the printed circuit board 41 is disposed. On the printed circuit board the electronic components (not illustrated) forming the electronic circuit of the level measuring device 1 are arranged. The electronic components are connected together electrically by conductor paths (not shown). Furthermore, the printed circuit board 41 is connected by a connecting line 42 to the terminals 43 which are arranged on a base 44 and project into the terminal space 45. The base 44 is configured so that the terminal strip of the lead terminals 43 assumes an acute angle to the axis of symmetry of the hood 4; this substantially facilitates connection of the electrical line in the terminal space 45. Connected to the terminals 43 is the cable 46 which connects the level measuring device 1 to an evaluating device and via which the measured values determined by the filling measuring device 1 are transmitted to the evaluating device and also the power necessary for the function of the level measuring device 1 is transmitted by the evaluating device. By means of the cable ferrule 47 the cable 46 is introduced into the terminal space 45 and the passage sealed.

The terminal space 45 also comprises the ground terminal 48. It is configured as a screw connection passing through the intermediate wall 49. The intermediate wall 49 has a further cutout 50 serving for the passage of the electrical line 42 from the printed circuit board 41 to the terminals 43. A screw connection 51 passes through a collar formed on the hood 4 for connection to the housing 2. The sealed connection between the parts— housing 2 and hood 4—is achieved in that the housing 2 has an annular web 36 and on the hood 4 a collar 52 encircles the surface and on its side facing the housing 2 is interrupted by a groove enclosing the web 36.

The terminal space 45 is closed by means of a cover 6 on the side remote from the diaphragm 25. The cover 6 is supported by a collar 61 lying opposite the annular end face 53 of the hood 4. For sealing the cover 6 in the hood 4, on the cylindrical region 62 an encircling groove interrupting the outer surface is formed and an annular seal 63 is arranged therein. The annular seal 63 may be formed by a commercially usual O-ring seal. The hood 4 is so configured that the level measuring device 1 can again be given two different constructional forms. For use in normal atmosphere the hood 4 is configured as has just been described. However, for use in explosive medium it is necessary to seal the current-carrying parts of the printed circuit board 41 hermetically from the outside. For this purpose a commercially usual potting composition 57 is introduced through the cutout 50 into the interior of the hood 4 when the cover 6 is open until the interior is completely filled up to the separating wall 49 and the electrical components arranged on the printed circuit board 41, including said board itself, are surrounded by the potting composition.

This therefore again gives two different possible configurations which can be combined with the foregoing configurations in any manner:

exposed printed circuit board for use in normal atmosphere;

potted printed circuit board for use in explosive media.

Formed on the outer wall of the hood 4 above the partition wall 49 are two bushes 54 which are arranged diametrically opposite each other. To clarify the illustration, in FIG. 1 only one of the two bushes 54 is shown. The bushes 54 are traversed by a thread and together form with the screw 55 a screw connection by which a bracket 56 is secured to the hood 4. The bracket 56 now permits a further combination of the level sensor 1. For with the bracket 56 it is possible to suspend the level sensor 1 on the container wall or the lid of a container or above an open drain deflectably in all directions. The flange connections 34a, 34b are of course then dispensed with. The possibility of arranging the bracket 56 also affords in combination with the remaining components referred to a further constructional variant of the sensor measuring device 1 governed by the use:

flange mounting
bracket mounting.

Now, it is apparent from FIG. 3 how the level measuring device 1 can be made up selectively from the self-contained components, depending on the intended use. In FIG. 3 this is shown with the aid of some examples. FIG. 3a shows the hood 4 in the unpotted state for use in normal atmospheric conditions. FIG. 3b shows the hood 4 in the potted state for use in explosive atmosphere. The illustration of the screw connection 55 and the bracket 56 in FIG. 3a as well as the omission in FIG. 3b indicates that in accordance with the use the ultrasonic sensor 1 can be mounted by means of a bracket. FIG. 3c shows the housing 2 for use under normal atmospheric pressure without the steel plate 32. FIG. 3d shows that in the interior of the housing 2 the steel plate 32 is disposed, thereby equipping the level measuring device for measuring the contents level in a container with elevated internal pressure. Of course, any combination of the parts a, b, c, d with each other is possible.

Figure 3A:
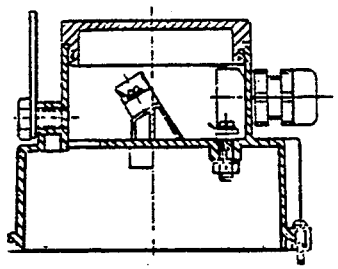
FIG. 3 is a schematic illustration from which it can be seen how the subject of the invention can be assembled from the individual components depending on the use conditions thereof.
Figure 3B:
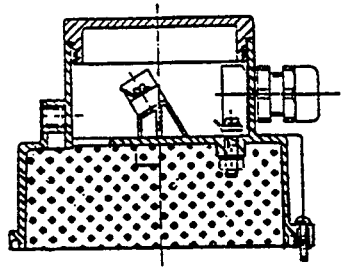
Figure 3C:
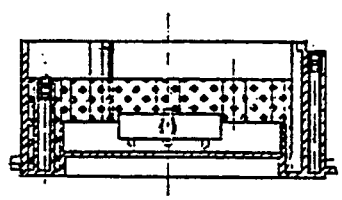
Figure 3D:
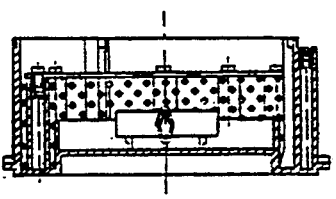
Figure 3E:
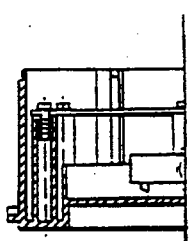
Figure 3F:
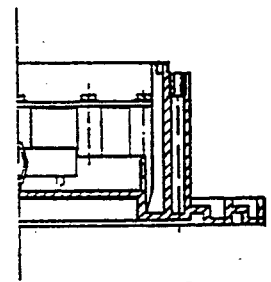

FIG. 3e illustrates that the housing 2, with omission of the bracket 56, can be secured by means of a coupling flange 34 to a wall enclosing the medium measured, being suitable for relatively small nominal widths. FIG. 3d shows the housing 2 under the same use conditions but for cases where relatively large nominal widths are involved.

The many different possible uses of the level sensor 1 by combinations of only a few components are thus clearly apparent to the person skilled in the art.

We claim:

1. A level measuring device for measuring the level of a material within a container, the level measuring device comprising an ultrasonic transducer for directing a transmitted pulse onto the surface of said material within said container and receiving the echo signal reflected at the surface of said material, an electrical circuit for exciting said ultrasonic transducer to oscillations and for converting said received reflected echo signal to an electrical signal which is transmitted to an evaluating device, said electronic circuit receiving the electrical energy necessary for the operation of the level measuring device from said evaluating device, wherein (a) said ultrasonic transducer is surrounded by a housing and together with said housing forms a first functional unit;

(b) said electrical circuit is surrounded by a hood and together with said hood forms a second functional unit;

(c)d said housing and said hood are detachably connected to each other;

(d) said housing is secured to a wall of said container enclosing said materials to be measured by means of a coupling flange which surrounds a sealing strip extending radially outwardly from the surface of said housing;

(e) said ultrasonic transducer is located in a cylindrical trough which is coupled to the sealing strip to reduce the effect of vibration of the container on the transducer;

(f) said ultrasonic transducer is covered on the side not facing said material to be measured by a steel plate which is borne by supports integrally formed with a ring zone of said housing and extending through the interior of said housing; and (g) on said hood a terminal space is integrally formed in the interior of which electrical connecting elements for connecting the level measuring device with said evaluating device are arranged and which is closed by a cover.

2. The level measuring device according to claim 1 wherein said sealing strip includes two separate annular sealing surfaces provided with cutouts and webs, said sealing strip extending on the side of said housing facing said material to be measured and being surrounded by a shoulder of said coupling flange.

3. The level measuring device according to claim 1 wherein said steel plate is connected by screw connections to said supports.

4. The level measuring device according to claim 1 wherein said housing and said hood are formed by injection molding from a thermoplastic material.

5. The level measuring device according to claim 1 wherein said electrical circuit is formed on a printed circuit board arranged in the interior of said hood.

6. The level measuring device according to claim 5 wherein said ultrasonic transducer is electrically connected with said printed circuit board by means of an electrical line, said printed circuit board is electrically connected with terminals arranged in said terminal space, and said terminals are electrically connected with said evaluating device via a connecting cable.

7. The level measuring device for measuring the level of a material within a container, the level measuring device comprising an ultrasonic transducer for directing a transmitted pulse onto the surface of said material within said container and for receiving the echo signal reflected at the surface of said material, an electrical circuit for exciting said ultrasonic transducer to oscillations and for converting said received reflected echo signal to an electrical signal which is transmitted to an evaluating device, said electronic circuit receiving the electrical energy necessary for the operation of the level measuring device from said evaluating device, the improvement comprising:

a housing for enclosing said ultrasonic transducer;
an annular flange coupled to the housing for securing the housing to a wall of said container; and
a sealing strip extending radially from an outer surface of said housing, the sealing strip being located between the flange and the wall of the housing to prevent static charging of the housing.

8. The level measuring device according to claim 7 further comprising means for coupling the ultrasonic transducer to the housing to isolate the transducer from said container to reduce the affect of vibration of the container on the transducer.

9. The level measuring device according to claim 8 wherein the coupling means includes a cylindrical trough coupled to the sealing strip, the transducer being located in the cylindrical trough.

10. The level measuring device according to claim 7 wherein said sealing strip includes two separate annular sealing surfaces provided with cutouts and webs, said sealing strip extending on the side of said housing facing said material to be measured and being surrounded by a shoulder of said flange.

11. The level measuring device according to claim 7 wherein said ultrasonic transducer is covered on a side opposite from the container a steel plate.

12. The level measuring device according to claim 7, wherein said sealing strip includes intermediate walls and recesses to prevent static charging of the housing.

13. The level measuring device for measuring the level of a material within a container, the level measuring device comprising an ultrasonic transducer for directing a transmitted pulse onto the surface of said material within said container and for receiving the echo signal reflected at the surface of said material, an electrical circuit for exciting said ultrasonic transducer to oscillations and for converting said received reflected echo signal to an electrical signal which is transmitted to an evaluating device, said electronic circuit receiving the electrical energy necessary for the operation of the level measuring device from said evaluating device, the improvement comprising:

a housing for enclosing said ultrasonic transducer;
an annular flange coupled to the housing for securing the housing to a wall of said container;
a sealing strip extending radially from an outer surface of said housing, the sealing strip being located between the flange and the wall of the housing, and
a cylindrical trough coupled to the sealing strip, the transducer being located in the cylindrical trough to couple the transducer to the container to isolate the transducer from said container and to reduce the affect of vibration of the container on the transducer.

14. The level measuring device according to claim 13 wherein said sealing strip includes two separate annular sealing surfaces provided with cutouts and webs, said sealing strip extending on the side of said housing facing said material to be measured and being surrounded by a shoulder of said flange.

15. The level measuring device according to claim 13 wherein said ultrasonic transducer is covered on a side opposite from the container a steel plate.

16. The level measuring device according to claim 13, wherein said sealing strip includes intermediate walls and recesses to prevent static charging of the housing.

* * * * *